(12) United States Patent
Niemann

(10) Patent No.: US 7,658,501 B2
(45) Date of Patent: Feb. 9, 2010

(54) CUTOFF/MILLING DEVICE

(75) Inventor: Bernhard Niemann, Haseluenne (DE)

(73) Assignee: Metabowerke GmbH, Nuetingen (DE)

( * ) Notice: Subject to any disclaimer, the term of this patent is extended or adjusted under 35 U.S.C. 154(b) by 350 days.

(21) Appl. No.: 11/337,483

(22) Filed: Jan. 24, 2006

(65) Prior Publication Data

US 2006/0203469 A1    Sep. 14, 2006

(30) Foreign Application Priority Data

Mar. 10, 2005    (EP)    ................................. 05005246

(51) Int. Cl.
*F21V 33/00* (2006.01)
(52) U.S. Cl. .......................... 362/89; 362/119; 362/253; 362/276; 362/802; 83/520
(58) Field of Classification Search .................... 362/89, 362/119, 253, 259, 276, 802; 83/432, 468.3, 83/471.3, 477.1, 520, 521, 522.18, 581
See application file for complete search history.

(56) References Cited

U.S. PATENT DOCUMENTS

| 5,461,790 A * | 10/1995 | Olstowski .................... 362/119 |
| 6,035,757 A | 3/2000 | Caluori et al. |
| 6,318,874 B1 * | 11/2001 | Matsunaga ................... 362/119 |
| 2002/0131267 A1 | 9/2002 | Van Osenbruggen |
| 2003/0233921 A1 | 12/2003 | Garcia et al. |
| 2004/0083869 A1 | 5/2004 | Aziz et al. |
| 2004/0182215 A1 | 9/2004 | Ushiwata et al. |
| 2005/0117613 A1 * | 6/2005 | Tung ............................ 372/1 |

FOREIGN PATENT DOCUMENTS

| DE | 90 10 716.0 U1 | 10/1990 |
| DE | 296 16 604 U1 | 12/1996 |
| DE | 201 20 529 U1 | 4/2002 |
| DE | 203 02 813 U1 | 6/2003 |
| DE | 102 15 871 C1 | 10/2003 |

* cited by examiner

*Primary Examiner*—Sandra L O'Shea
*Assistant Examiner*—Meghan K Dunwiddie
(74) *Attorney, Agent, or Firm*—David S. Safran; Roberts Mlotkowski Safran & Cole, P.C.

(57) ABSTRACT

A cutoff/milling device with a motor-driven cutoff/milling element, a work support surface or a guide surface, and a light projection device, the light projection device projecting a light beam onto a workpiece which is located on the work support surface or under the guide surface such that the light beam marks the cutting/milling position or cutting/milling path on the workpiece. The light projection device has a switch for activation of the light projection in response to mechanical vibration produced either by operating of the device or manual knocking on the cutoff/milling device.

20 Claims, 4 Drawing Sheets

CUTOFF/MILLING DEVICE

BACKGROUND OF THE INVENTION

1. Field of Invention

The invention relates to a cutoff/milling device with a motor-driven cutoff/milling element, a work support surface, and a light projection device, the light projection device projecting a light beam onto a workpiece which is located on the work support surface such that the light beam marks the cutting/milling position or cutting/milling path on the workpiece and the light projection device having a switch for activation of the light projection. The invention also relates to cutoff/milling device with a motor-driven cutoff/milling element, a guide surface, and a light projection device, the light projection device projecting a light beam onto a workpiece which is located underneath the guide surface such that the light beam marks the cutting/milling position or cutting/milling path on the workpiece and the light projection device having a switch for activation of the light projection device.

2. Description of the Related Art

Cutoff/milling devices are devices which are used for working of materials, especially for cutting off and/or milling the material to be worked. Special applications for a cutoff/milling device include woodworking, working of plastics, and metalworking. However, such a device can also be used in other areas. Cutoff/milling devices are defined especially as chopsaws, band saws, circular saws, especially circular table saws, saber saws, millers and abrasive cutting machines.

A chop and miter saw known from the prior art (U.S. Patent Application Publication 2004/0182215 A1) has a motor-driven saw blade, a work support surface, and a light projection device. The light projection device projects a light beam onto a workpiece which is located on the work support surface for sawing. The light beam is projected onto the workpiece when the saw blade is still in its rest position, therefore has not yet been swung into the sawing position. The light beam thus marks the cutting position or cutting path on the workpiece, depending on whether the light beam marks essentially one point or a line of the workpiece. The light projection device in this chop and miter saw is located on the holder of the saw assembly or on a section of a handle.

In one alternative configuration of the chop and miter saw, the light projection device is used not only to mark the cutting path on the workpiece, but also the cut width of the saw blade (U.S. Patent Application Publication 2003/0233921 A1). This is done by the light projection device projecting two light beams which are spaced apart from one another onto the workpiece.

Providing a light projection device for a circular saw or a band saw (German Utility Models DE 296 16 604 U1 and DE 203 02 813 U1) is also known from the prior art. In the circular saw of German Utility Model DE 296 16 604 U1, the light projection device is located on a protective hood which surrounds the saw blade. The light projection device has its own power supply unit with batteries which is independent of the grid. Accordingly, the projection device here has its own switch for turning it on. Thus, there is the danger that, after a sawing process, turning off of the light projection device is forgotten so that the batteries are unnecessarily discharged.

Light projection devices of the type under consideration are also suited for use in cutoff/milling devices which can be placed from overhead on the workpiece to be worked, therefore manual circular saws, saber saws, or the like which have been known for decades in a host of embodiments (German Utility Model DE 90 10 761 U1).

The prior art (U.S. Patent Application Publication 2004/008369 A1) which forms the starting point of this invention discloses a chop and miter saw in which the light projection device is activated by means of a switch which reacts to motion of the saw blade, therefore the running of the machine. For this reason, the switch is made with a motion sensor. Activation of the light projection device presupposes the start of machine operation.

Other types of switches or sensors for detection of machine operation for activation of the light projection device are known from other known cutoff/milling devices (German Patent DE 102 15 871 C1, German Utility Model DE 201 20 529 U1, U.S. Patent Application Publication 2002/0131267 A1, U.S. Pat. No. 6,035,757).

SUMMARY OF THE INVENTION

A primary object of this invention is to optimize a cutoff/milling device of the aforementioned type with respect to the light projection device.

The invention achieves the above explained object in a cutoff/milling device of the initially mentioned types by the switch for turning on of the light projection being a vibration switch so that the light projection device can be activated already by light mechanical vibration of the cutoff/milling device such as knocking on the cutoff/milling device.

In this way, the light projection device can be activated by any mechanical vibration of the cutoff/milling device. Mechanical vibration is always the running of the machine, therefore the starting of the motor-driven cutoff/milling element. However, in particular, it can also be a manual actuation like knocking on the cutoff/milling device. The vibration switch enables simple and uncomplicated activation of the light projection device, even independently of the machine's running, so that the workpiece can be aligned using the light beam for machining.

In a preferred version, the light projection device has its own switch in addition to the vibration switch, by means of which the operating states "light projection device on" and "light projection device off" can be selected. In the operating state "light projection device on," it can be activated by mechanical vibration, while in the operating state "light projection device off," mechanical vibration does not lead to activation of the light projection device. The additional switch thus prevents unintentional actuation of the light projection device by mechanical vibration, for example, when the cutoff/milling device is being transported.

Furthermore, it advantageous if the light projection device has a timer which turns it off after a given time interval—the shutoff time interval. This ensures that the light projection device does not remain in operation for an unnecessarily long time after the completion of workpiece machining. In this way, unnecessary discharging especially with battery power supply is prevented.

Other details, features, objectives and advantages of this invention are explained in detail below in conjunction with the accompanying drawings which show a preferred embodiments of the invention.

DETAILED DESCRIPTION OF THE PREFERRED EMBODIMENTS

Figure 1:
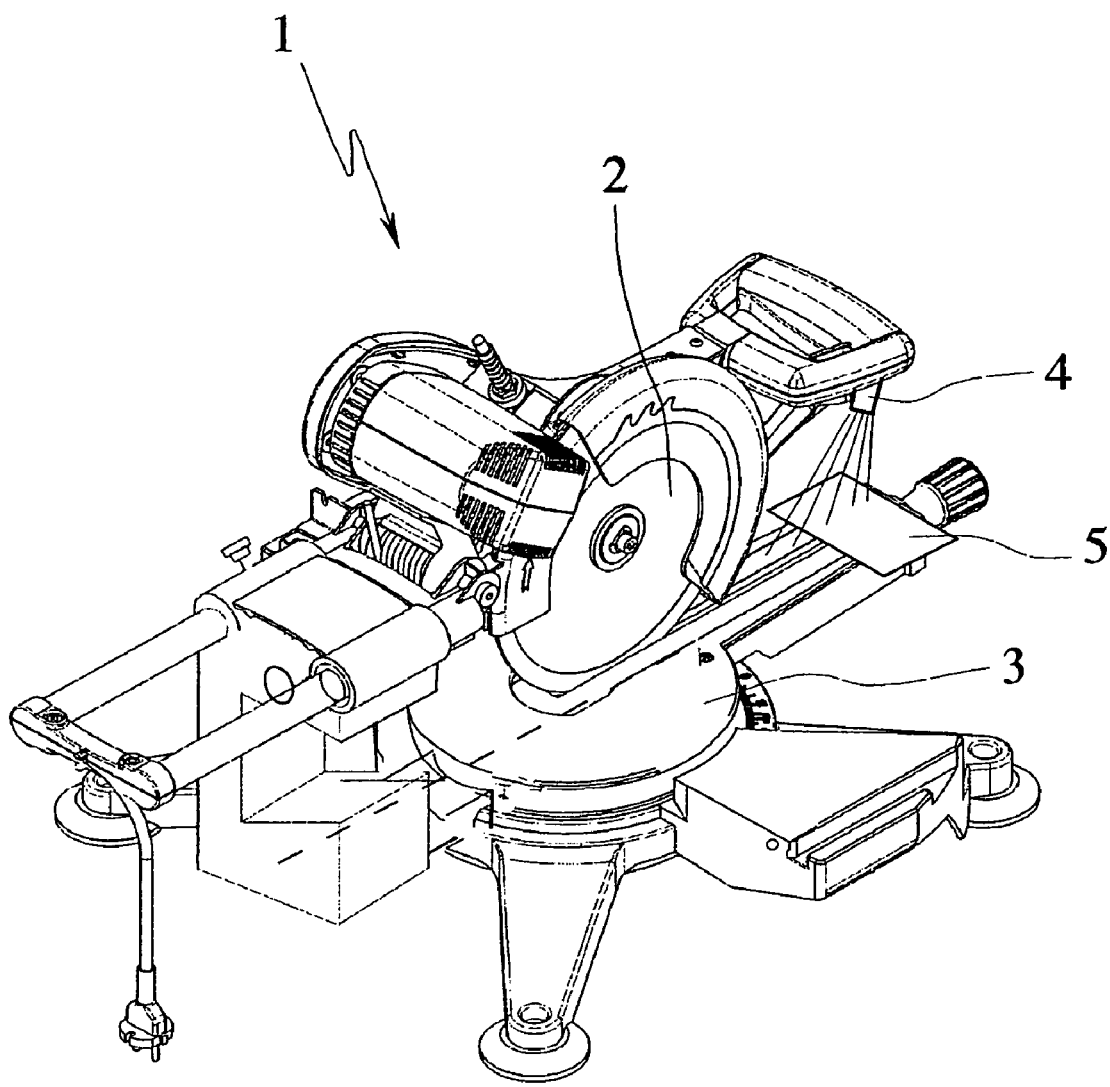
FIG. 1 is a perspective view of a first embodiment of a cutoff/milling device with a light projection device.

The cutoff/milling device 1 which is shown in FIG. 1 is a chop and miter saw. The cutoff/milling device 1 has a motor-driven cutoff/milling element 2, specifically a saw blade, a work support surface 3 and a light projection device 4.

To machine the workpiece 5, it is located on the work support surface 3. In order to correctly position the workpiece 5 for machining, the light projection device 4 projects a light beam onto the workpiece 5 which is located on the work support surface 3. The light beam marks the cutting/milling location or the cutting milling path on the workpiece 5. The cutting/milling position is marked when the light beam marks essentially one point on the workpiece 5 which lies in the machining plane of the motor-driven cutoff/milling element 2. The cutting/milling path is marked when the light beam marks not only a point in the machining plane of the cutoff-milling element 2, but a line on the workpiece 5.

Figure 4:
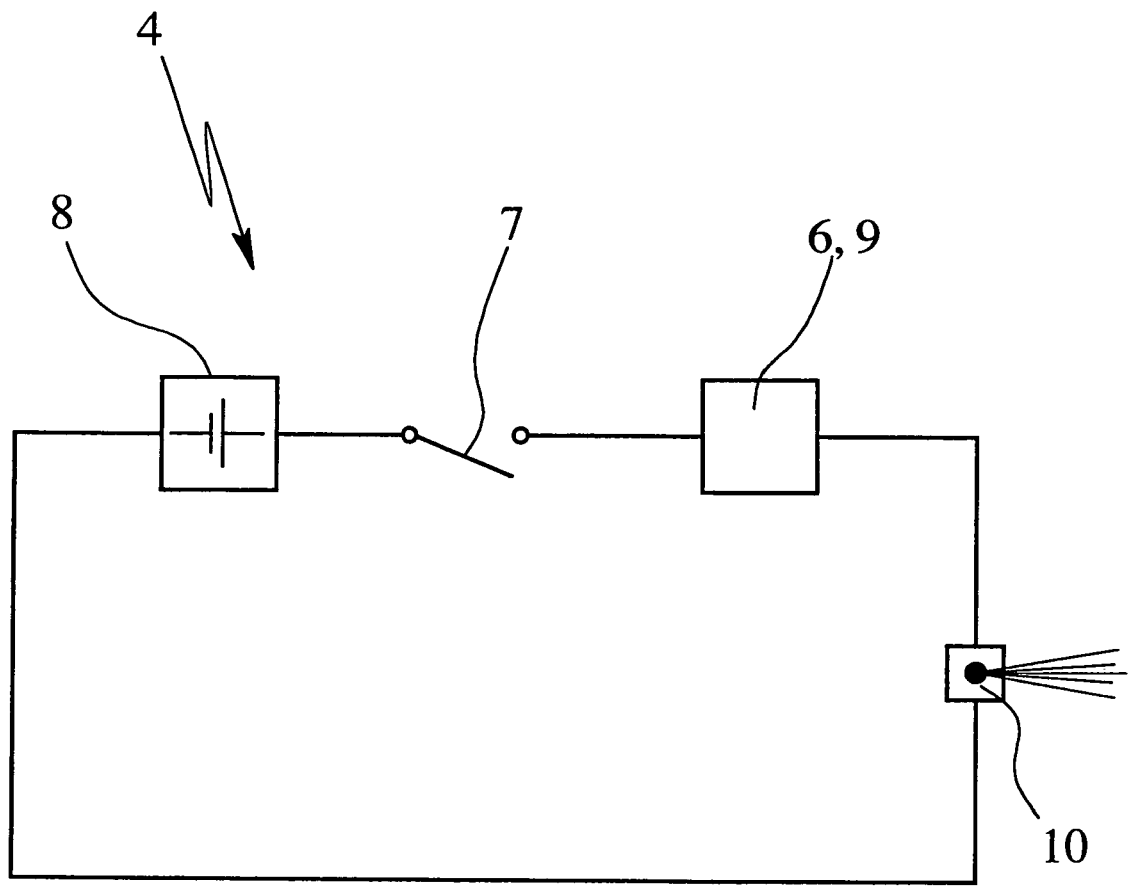
FIG. 4 shows a circuit arrangement of the light projection device.

The light projection device 4 has a vibration switch 6 (FIG. 4). Based on the vibration switch 6, the light projection device 4 can be activated by mechanical vibration of the cutoff/milling device 1. The mechanical vibration which leads to activation of the light projection device 4 is always generated by the running of the cutoff-milling element 2. However, this switch 6 already responds to light manual actuation, such as knocking on the cutoff/milling device 1 or vibration of the cutoff/milling device 1 as a result of actuation of a switch.

Figure 2:
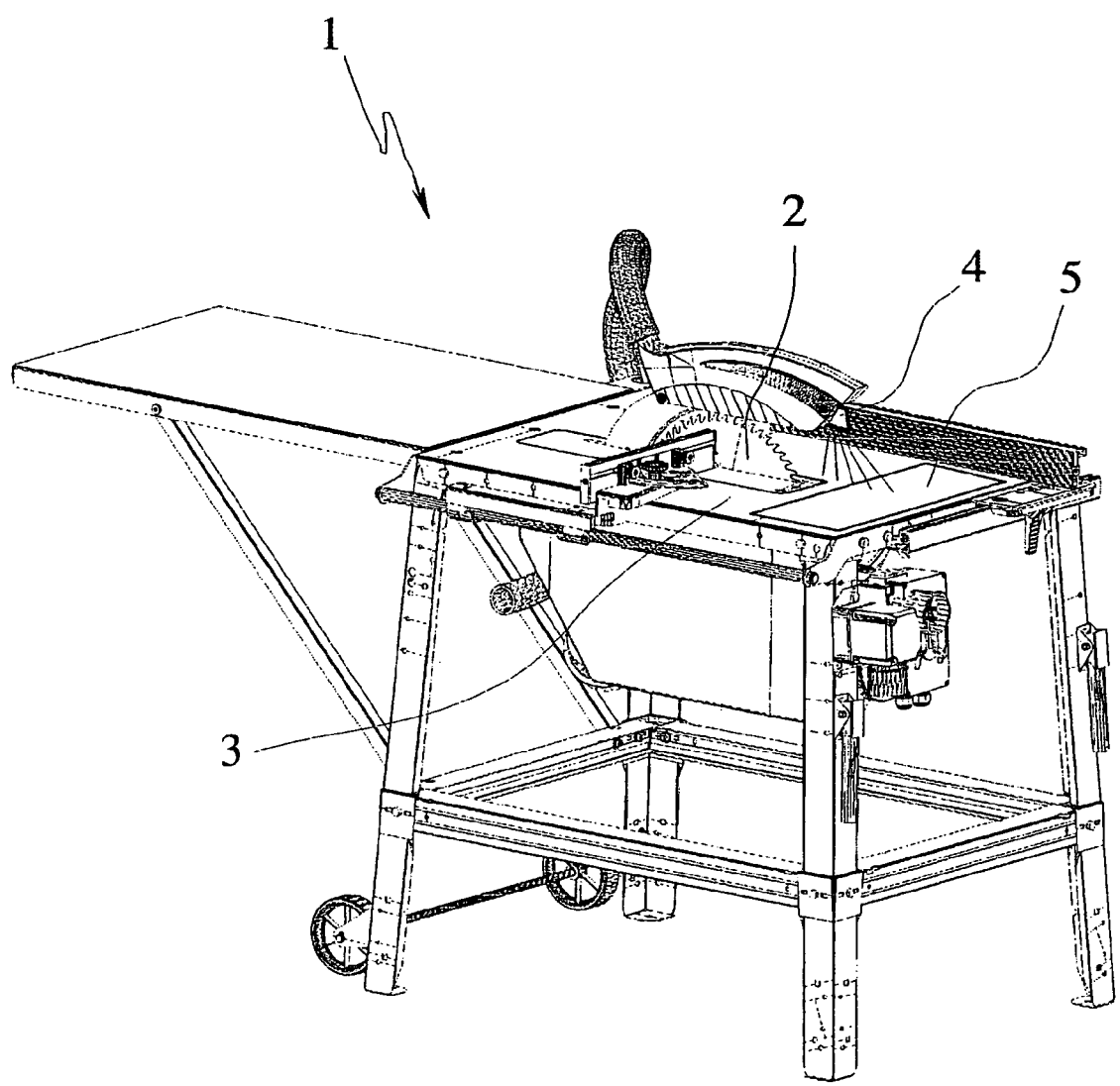
FIG. 2 is a perspective view of a second embodiment of a cutoff/milling device with a light projection device.

FIG. 2 shows a cutoff/milling device 1 which is made as a circular table saw. A light projection device 4 is important basically in all cutoff/milling devices 1 in which the cutting location or cutting path cannot be unambiguously recognized before or during the machining of the workpiece 5 without a light projection device 4. They include, for example, also band saws and a combination of a chopsaw with a circular table saw, therefore a chop and a circular table saw, or a chop, miter and circular table saw.

Figure 3:
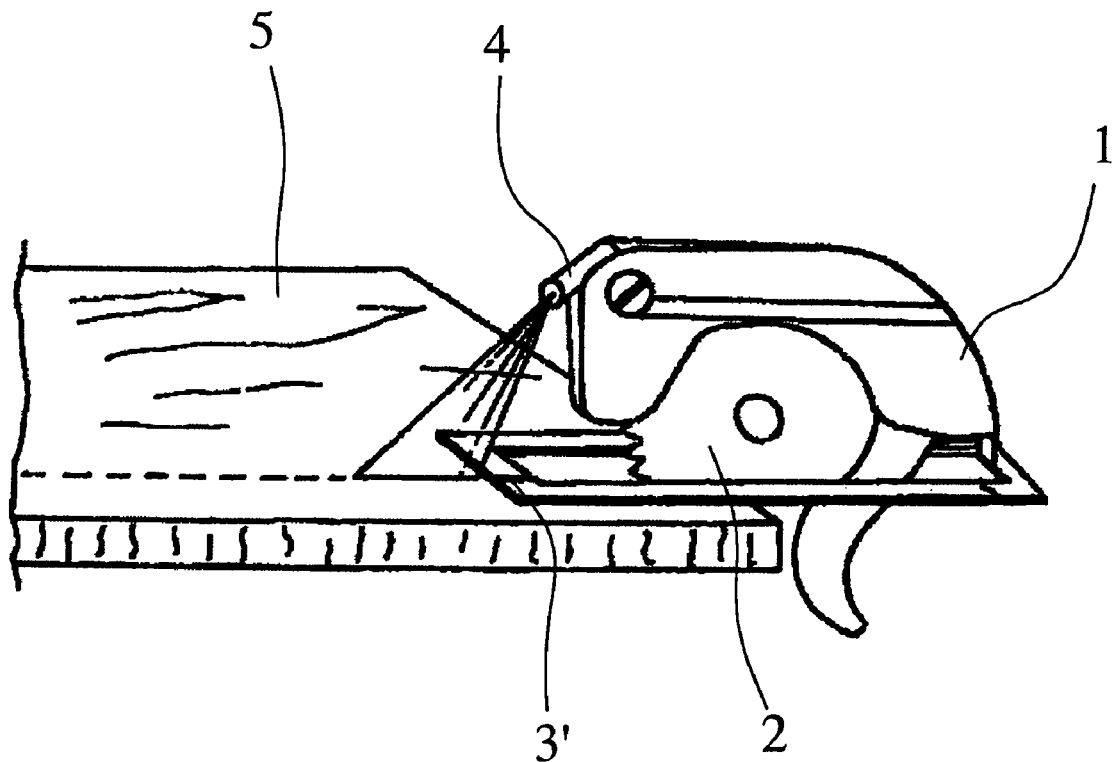
FIG. 3 is a perspective view of a third embodiment of a cutoff/milling device with a light projection device.

FIG. 3 shows an alternative cutoff/milling device 1 which differs from the above described cutoff/milling device 1 in that there is no work support surface 3 with a workpiece 5 located on it, but rather there is a guide surface 3' with which the cutoff/milling device 1 lies on the workpiece 5. This guide surface 3' often covers the cutting/milling location so that, even in this arrangement, the above described light projection device 4 with a vibration switch 6 can be used to advantage. This cutoff/milling device 1 can be, for example, a saber saw, a manual circular saw, a groove milling machine or an abrasive cutting machine.

For such a cutoff/milling device 1, the same features and advantages apply accordingly, as have already been described for the cutoff/milling device 1 or as will be described below.

The light projection device 4 here (FIG. 1) is connected to the power supply of the cutoff/milling device 1. The light projection device 4 can be coupled directly to the power supply of the cutoff/milling device 1, i.e., as soon as the cutoff/milling device 1 is connected to the power supply, the light projection device 4 can be activated by means of the vibration switch 6.

Furthermore, it can be provided that the light projection device 4 is coupled to the main switch of the cutoff/milling device 1. Only activation of the main switch of the cutoff/milling device 1 enables activation of the light projection device 4 by mechanical vibration. This is especially advantageous in a cutoff/milling device 1 in which the motor-driven cutoff/milling element 2 is not already being started by actuating the main switch of the cutoff/milling device 1, but additional actuation is necessary for this purpose, for example, pulling a lever on a handle, as is conventionally the case in a chopsaw.

However, preferably, the light projection device 4 is provided with its own switch 7 (FIG. 4). The light projection device 4 can be switched into the "on" and "off" operating states by means of the switch 7. In the "on" operating state, the light projection device 4 can be activated by mechanical vibration, i.e., with mechanical vibration the vibration switch 6 activates the light projection device 4. In the "off" operating state, the light projection device 4 cannot be activated even by mechanical vibration.

FIG. 4 shows a circuit arrangement for the cutoff/milling device 1 in which the light projection device 4 has its own power supply 8. This independent power supply 8 is conventionally implemented using batteries. The independent power supply 8 is especially advantageous when it is difficult to connect to the power supply of the cutoff/milling device 1 due to the spatial arrangement. This is especially the case in a circular table saw since the light projection device 4 is advantageously located on the saw blade guard (FIG. 2).

In a light projection device 4 with its own power supply 8, an independent switch 7 for the light projection device 4, as was described above, is also advantageous (FIG. 4). This switch 7 specifically enables the light projection device 4 to be switched into the "off" operating state, and thus, enables activation of the light projection device 4 by mechanical vibration to be prevented, for example, when the cutoff/milling device 1 is being transported.

Here, the light projection device 4 preferably has a timer 9 (FIG. 4). The light projection device 4 can be turned off by means of the timer 9 after a given time interval, the shutoff time interval. After completion of machining of the workpiece 5, therefore after the last occurrence of a mechanical vibration, this leads to the light projection device 4 continuing to operate only for a time interval which corresponds to the shutoff time interval of the timer 9, and then, automatically shutting off. This prevents the light projection device 4 from staying activated because shutting it off was forgotten. This is especially important when the light projection device 4 has its own power supply 8. A time interval between one second and ten seconds, especially a time interval of roughly five seconds, is especially suited as the shutoff time interval. The shutoff time interval of the timer 9 can be set in one preferred version.

The timer 9 shown here (FIG. 4) is directly coupled to the vibration switch 6. This has the advantage that the light projection device 4 is not currently turned off during operation of the cutoff/milling device 1 after the shutoff time interval has expired and then is turned on again by a vibration switch 6, but is continuously activated and is turned off only after completion of machining of the workpiece 5.

In the illustrated embodiments of the cutoff/milling device 1 (FIGS. 1 to 4), the light projection device 4 has a positioning laser as the light source 10. The term "positioning laser" is defined here as any laser which is suited to being located on part of a cutoff/milling device 1, and in doing so, to marking the cutting/milling position or the cutting/milling path on the workpiece 5.

The light source 10 of the light projection device 4 can be located anywhere on the cutoff/milling device 1. However, it must be watched that the light source 10 is arranged such that the marking on the workpiece 5 can be seen before machining of the workpiece 5, and preferably, also during machining of the workpiece 5. Furthermore, it is advantageous if the light source 10 is arranged such that the light beam originating from the light source 10 lies on single plane with the cutoff/milling element 2 over its entire path. In this arrangement, the exact marking on the workpiece 5 is independent specifically of the height of the workpiece 5 or a possible pivoting motion of the light projection device 4, and thus, a change of height.

When the cutoff/milling device 1 is a chopsaw, a flange laser is also well suited for use as a light source 10. A flange laser is a laser which is mounted on the flange of the cutoff/milling device 2, therefore on the flange of the saw blade. Accordingly, the flange laser is not located in a single plane with the cutoff/milling element 2; this leads to the light beam striking the workpiece 5 obliquely instead of, perpendicularly. As a result, the exact marking on the workpiece 5 is dependent on height; therefore, when the saw assembly with the saw blade and the flange laser is pivoted, the height changes, and for this reason, the marking on the workpiece 5 is shifted. However, this can be kept within such narrow limits that it is still acceptable for machining of workpieces 5.

In a cutoff/milling device 1 which is a chop and circular table saw or a chop, miter and circular table saw, it is especially advantageous if the light projection device 4 is arranged such that it marks the cutting position or cutting path on the workpiece 5, both in the chop or mitering function and also in the circular table saw function.

Alternatively, in such a cutoff/milling device 1 it can also be provided that it has two light projection devices 4 or that one light projection device 4 has two light sources 10. Here, it is especially advantageous if, depending on operation, only one or the other of the two light projection devices 4 or of the two light source 10 is switched to be activated.

This can take place automatically when the saw unit is being turned from the chop function into the circular table saw function or vice versa. It is possible for the corresponding switches to be activated when the saw unit is being turned.

What is claimed is:

1. Cutoff/milling device, comprising:
   a motor-driven cutoff/milling element,
   a work support surface, and
   a light projection device for projecting a light beam onto a workpiece which is located on the work support surface such that the light beam marks a cutting/milling position or path on the workpiece, and
   the light projection device having a switch for activation of the light projection device;
   wherein the switch is a vibration switch which activates the light projection device in response to light mechanical vibration due to manual knocking on the device; and
   wherein the light projection device has a timer by which the light projection device is turned off after a preset shutoff time interval.

2. Cutoff/milling device as claimed in claim 1, wherein the cutoff/milling device is one of a cutoff saw, a chop and miter saw, a band saw and a circular table saw.

3. Cutoff/milling device as claimed in claim 1, wherein the light projection device is connected to a power supply of the cutoff/milling device.

4. Cutoff/milling device as claimed in claim 1, wherein the light projection device has a power supply which is independent of a power supply of the cutoff/milling device.

5. Cutoff/milling device as claimed in claim 1, wherein the light projection device has a second switch in addition to the vibration switch,
   wherein the light projection device is switchable into "on" and "off" operating states by means of the switch,
   wherein the light projection device is activatable by mechanical vibration in the "on" operating state, and
   wherein the light projection device cannot be activated by mechanical vibration in the "off" operating state.

6. Cutoff/milling device as claimed in claim 5, wherein the light projection device has a power supply which is independent of a power supply, of the cutoff/milling device.

7. Cutoff/milling device as claimed in claim 1, wherein the shutoff time interval of the timer is adjustable.

8. Cutoff/milling device as claimed in claim 1, wherein the light projection device is a positioning laser.

9. Cutoff/milling device as claimed in claim 1, wherein the light projection device is a flange laser.

10. Cutoff/milling device as claimed in claim 1, wherein the cutoff/milling device is a chop and circular table saw, and wherein the light projection device has two light sources or wherein a second light projection device is provided.

11. Cutoff/milling device as claimed in claim 10, wherein only one of the two light projection devices or light sources is switched to be activated depending on the type of cutoff/milling operation being performed.

12. Cutoff/milling device, comprising:
    a motor-driven cutoff/milling element,
    a guide surface, and
    a light projection device for projecting a light beam onto a workpiece which is located underneath the guide surface such that the light beam marks a cutting/milling position or path on the workpiece, and
    the light projection device having a switch for activation of the light projection device;
    wherein the switch is a vibration switch which activates the light projection device in response to light mechanical vibration due to manual knocking on the device; and
    wherein the light projection device has a timer by which the light projection device is turned off after a preset shutoff time interval.

13. Cutoff/milling device as claimed in claim 12, wherein the cutoff/milling device is one of a saber saw, a manual circular saw, a groove milling machine or an abrasive cutting machine.

14. Cutoff/milling device as claimed in claim 12, wherein the light projection device is connected to a power supply of the cutoff/milling device.

15. Cutoff/milling device as claimed in claim 12, wherein the light device has a power supply which is independent of a power supply of the cutoff/milling device.

16. Cutoff/milling device as claimed in claim 15, wherein the light projection device has a second switch in addition to the vibration switch,
    wherein the light projection device is switchable into "on" and "off" operating states by means of the switch,
    wherein the light projection device is activatable by mechanical vibration in the "on" operating state, and
    wherein the light projection device cannot be activated by mechanical vibration in the "off" operating state.

17. Cutoff/milling device as claimed in claim 16, wherein the light projection device has a power supply which is independent of a power supply of the cutoff/milling device.

18. Cutoff/milling device as claimed in claim 12, wherein the shutoff time interval of the timer is adjustable.

19. Cutoff/milling device as claimed in claim 12, wherein the light projection device is a positioning laser.

20. Cutoff/milling device as claimed in claim 12, wherein the light projection device is a flange laser.

* * * * *